(No Model.) 2 Sheets—Sheet 1.
M. ACKLIN.
BICYCLE.
No. 510,227. Patented Dec. 5, 1893.
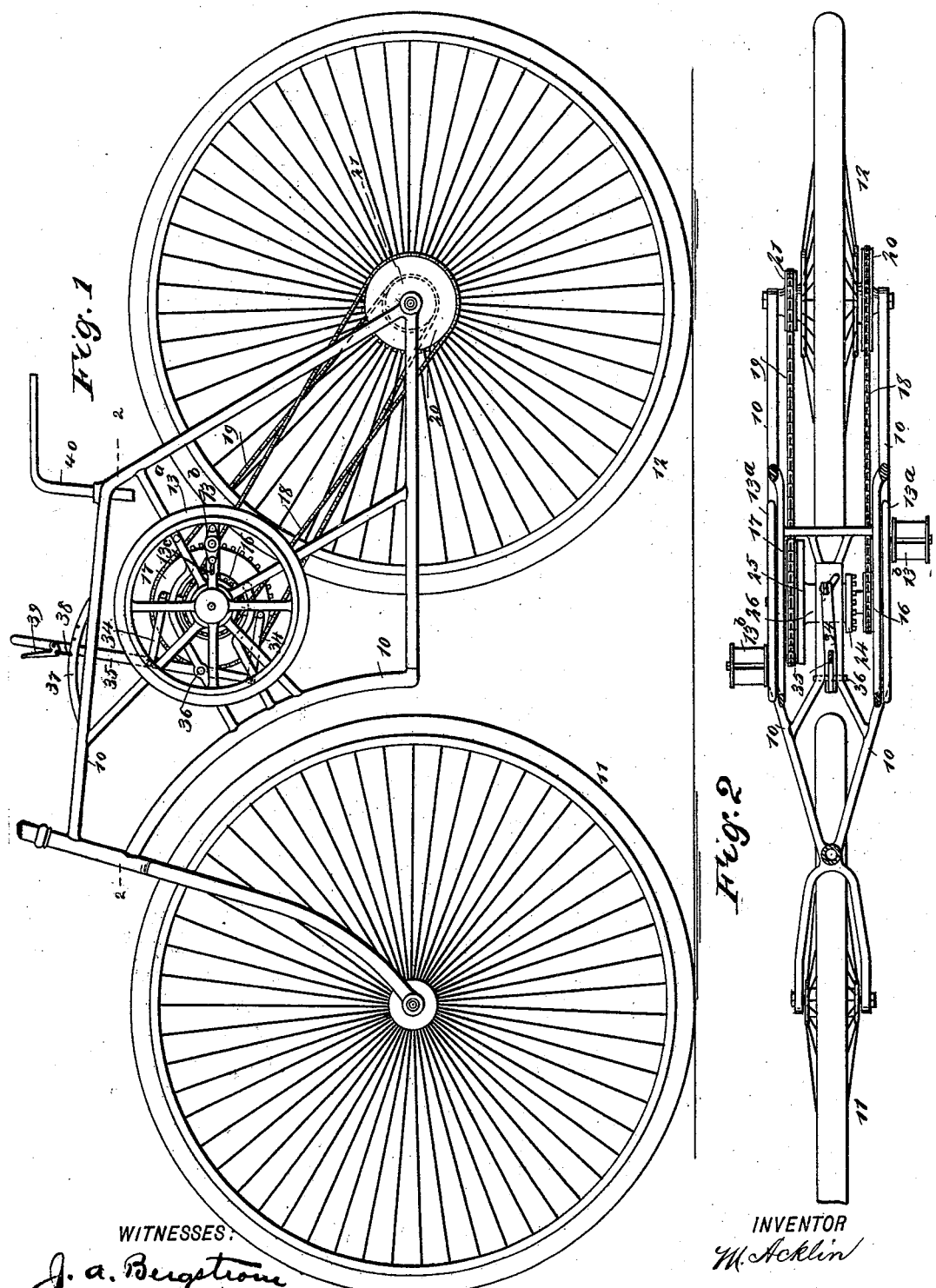
WITNESSES:
J. A. Bergstrom
C. Sedgwick
INVENTOR
M. Acklin
BY Munn & Co
ATTORNEYS.

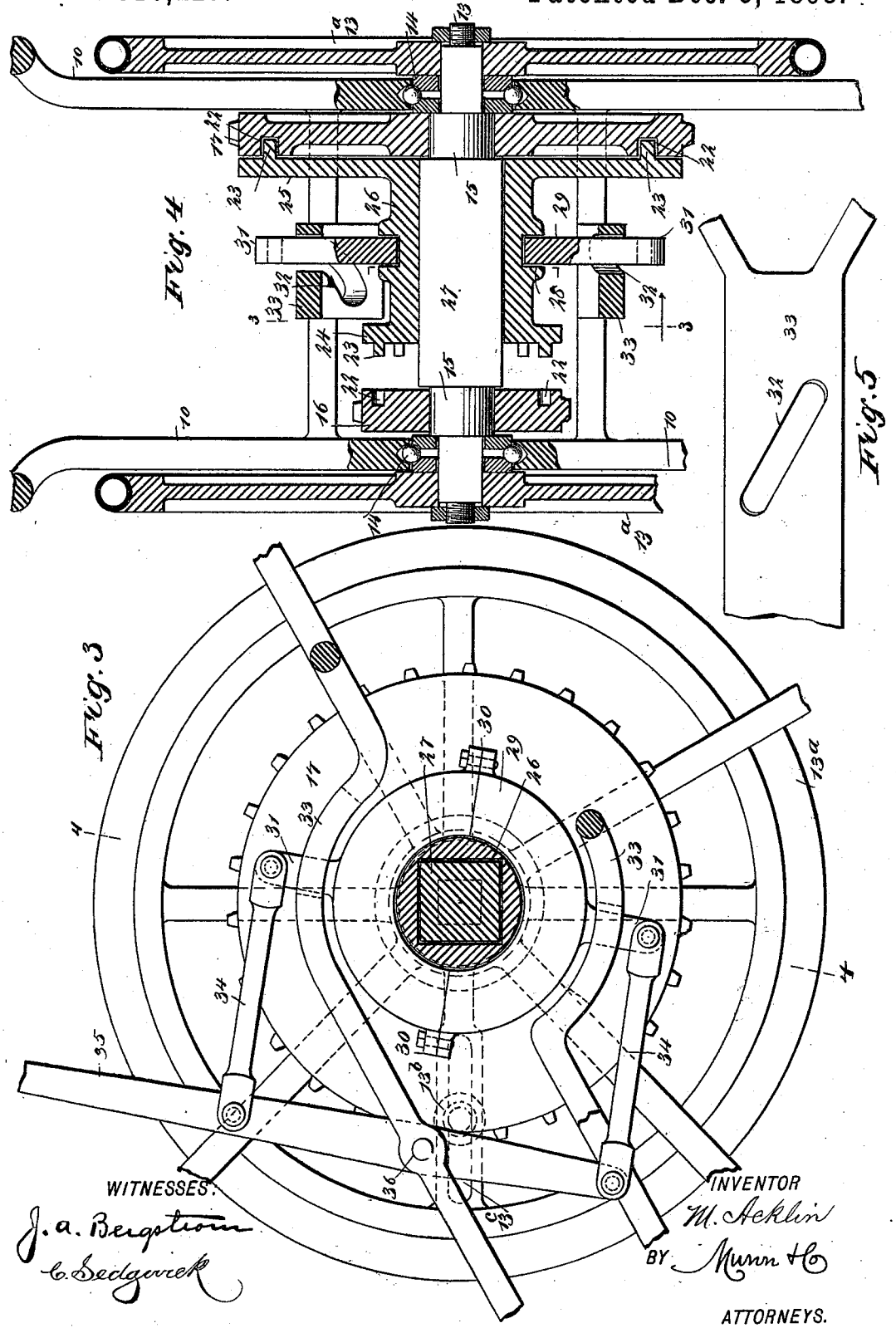

UNITED STATES PATENT OFFICE.

MURRAY ACKLIN, OF ANGEL ISLAND, CALIFORNIA.

BICYCLE.

SPECIFICATION forming part of Letters Patent No. 510,227, dated December 5, 1893.

Application filed May 19, 1893. Serial No. 474,782. (No model.)

*To all whom it may concern:*

Be it known that I, MURRAY ACKLIN, of Angel Island, in the county of Marin and State of California, have invented a new and Improved Bicycle, of which the following is a full, clear, and exact description.

My invention relates to improvements in bicycles and especially to the driving gear of bicycles.

The object of my invention is to produce an improved driving gear which may be applied to any safety bicycle, which is adapted to drive the machine easily and rapidly, and which may be easily changed while the machine is in motion, so as to drive it slowly and with great power and rapidly and with less power, thus adapting the machine for easy riding on hilly roads.

A further object of my invention is to make the speed shifting apparatus as simple, durable and convenient as possible.

To these ends my invention consists in certain features of construction and combinations of parts, as will be hereinafter described and claimed.

Reference is to be had to the accompanying drawings forming a part of this specification, in which similar figures of reference indicate corresponding parts in all the views.

Figure 1 is a broken side elevation of a safety bicycle provided with my improved driving gear. Fig. 2 is a sectional plan of the same on the line 2—2 in Fig. 1. Fig. 3 is a sectional elevation of the driving gear on an enlarged scale and on the line 3—3 in Fig. 4. Fig. 4 is a cross section on the line 4—4 in Fig. 3; and Fig. 5 is a broken plan view of one of the guide plates used in connection with the shifting gear.

The machine is provided with a suitable frame 10, which is substantially like the ordinary bicycle frame, but is a little wider to provide for the convenient arrangement of the speed shifting mechanism to be described below. The machine is provided with the usual front and rear wheels 11 and 12 and has journaled in the frame a transverse driving shaft 13 which is journaled in ball bearings 14 of the usual kind and has on its ends fly wheels $13^a$ which give to the shaft a steady motion and to these fly wheels are secured the pedals $13^b$, these being arranged off the center, as shown clearly in Figs. 1 and 3, and they are bolted in radial slots $13^c$ in the wheels, so that they may be adjusted to and from the center to suit the stride of the rider.

The driving shaft 13 is provided near opposite ends with bearings 15 which are circular in cross section on which are held loosely the sprocket wheels 16 and 17 which are of different sizes, the latter being the larger, and these sprocket wheels connect by chains 18 and 19 respectively with sprocket wheels 20 and 21, the former of which is the larger, on the hub of the rear wheel 12. The middle portion of the driving shaft is squared and provided with a clutch mechanism to engage either of the sprocket wheels 16 and 17, so as to make said wheels turn with the shaft, and it will be seen that when the sprocket wheel 16 is driven it will turn the wheel 12 with great power but at a comparatively slow speed, so that when the sprocket wheel 16 is in gear the machine is well adapted for hill climbing or traveling over a hard road, while when the sprocket wheel 17 is in gear the wheel 12 will be driven at a comparatively high speed and the machine, when thus geared, is adapted for rapid work on a good road.

The sprocket wheels 16 and 17 are provided on their inner sides with recesses or sockets 22 which are adapted to engage lugs 23 on the disks 24 and 25 which are arranged opposite the sprocket wheels and are formed on the ends of a sliding sleeve 26 which fits the squared central section 27 of the driving shaft 13. It will be seen then that when one of the disks 24 or 25 is thrown into engagement with one of the sprocket wheels 16 or 17, it will cause the said sprocket wheel to turn with the driving shaft.

The sleeve 26 is provided with a central annular groove 28, see Fig. 4, in which is fitted a ring 29, this being in two parts having abutting flanges 30 which are bolted together, as shown in Fig. 3. On the upper and lower sides of the ring are projecting lugs 31 which extend through slots 32 in the guide plates 33 which are arranged above and below the ring and are firmly secured to the frame 10. The slots 32 extend diagonally in the guide plates 33, as shown clearly in Figs. 4 and 5. The outer ends of the lugs 31 are pivotally connected, by means of pitmen 34, with a tilting lever 35 which extends in a nearly vertical position and is fulcrumed in the frame 10, as shown at 36, the fulcrum being between the pitmen 34 so that when the lever is swung either forward or backward the pitmen will move in opposite directions so as to turn the lugs 31 and ring 29, and the lugs 31, guided by the inclined slots 32, will move the ring 29 and sleeve 26 so as to throw either the disk 24 or 25 into engagement with the sprocket wheel 16 or 17.

The lever 35 is held to move opposite a quadrant 37, see Fig. 1, which is provided with notches to receive a slide bolt 38 operated by a latch 39 which is pivoted in the usual way on the lever 35. By locking the slide bolt into one of the end notches in the quadrant, the lever 35 is held so as to place the disk 24 in engagement with the sprocket wheel 16, thus adapting the machine for hill climbing.

By moving the bolt into the middle notch, the lever 35 is held so as to place the sleeve 26 in a central position, thus leaving both sprocket wheels loose and, when thus arranged, the machine is adapted for coasting. By moving the slide bolt into the other end notch of the quadrant, the lever 35 is held in position to place the disk 25 in engagement with the sprocket wheel 17, and the machine is then geared for high speed.

The machine is provided with a saddle stem 40 on which the usual saddle may be arranged, and the machine is operated in the customary manner by means of the pedals 13$^b$.

While the fly wheels 13$^a$ are shown in Fig. 1 somewhat smaller than the main wheels 11 and 12, I desire it to be understood that I intend the fly wheels shall be one-half the size of the main wheels and they are to be set in such a relation to the frame of the machine that the upper part of the frame will act as a leg guard. It will also be understood that as many lugs 23 will be provided on the disks 24 and 25, as may be employed with advantage, in order to insure complete co-adaptation to the sockets 22 in the sprocket wheels 16 and 17.

Having thus described my invention, I claim as new and desire to secure by Letters Patent—

1. In a bicycle, in combination, the main frame having cam portions, the drive wheels, the drive shaft journaled in such frame, sprocket wheels of different diameters loosely mounted on such shaft connected by chains with sprocket wheels on one of the drive wheels, a sliding clutch member on such shaft adapted to be alternately moved into engagement with the loose sprockets, a main or operating lever pivoted to the main frame, link arms connected to such lever at each side of the pivot, a shifting disk held to engage the cam portions of the frame connected to the sliding clutch and the link arms, and adapted for alternate adjustment by the movement of the main lever all substantially as shown and specified.

2. In a bicycle, in combination, the main frame, the drive wheels, sprocket wheels of different diameters, mounted on the shaft of one of the wheels, the drive shaft supporting frame section having members 33 having opposite projecting diagonal slots 32, the drive shaft journaled in the frame between the members 33, having sprocket wheels of different diameters loosely journaled thereon, the connections between such wheels and the sprocket wheels on the drive wheel, the sliding clutch 26 on the drive shaft having grooves 28 the disk 29 fitting therein, having arms 31 passed through the slots 32 the lever 35 pivoted to the frame 33, the link arms 34 and the drive pedals all arranged substantially as shown and for the purposes described.

MURRAY ACKLIN.

Witnesses:
H. F. CLAUSEN,
GEORGE W. HARDING.